Patented Apr. 10, 1951

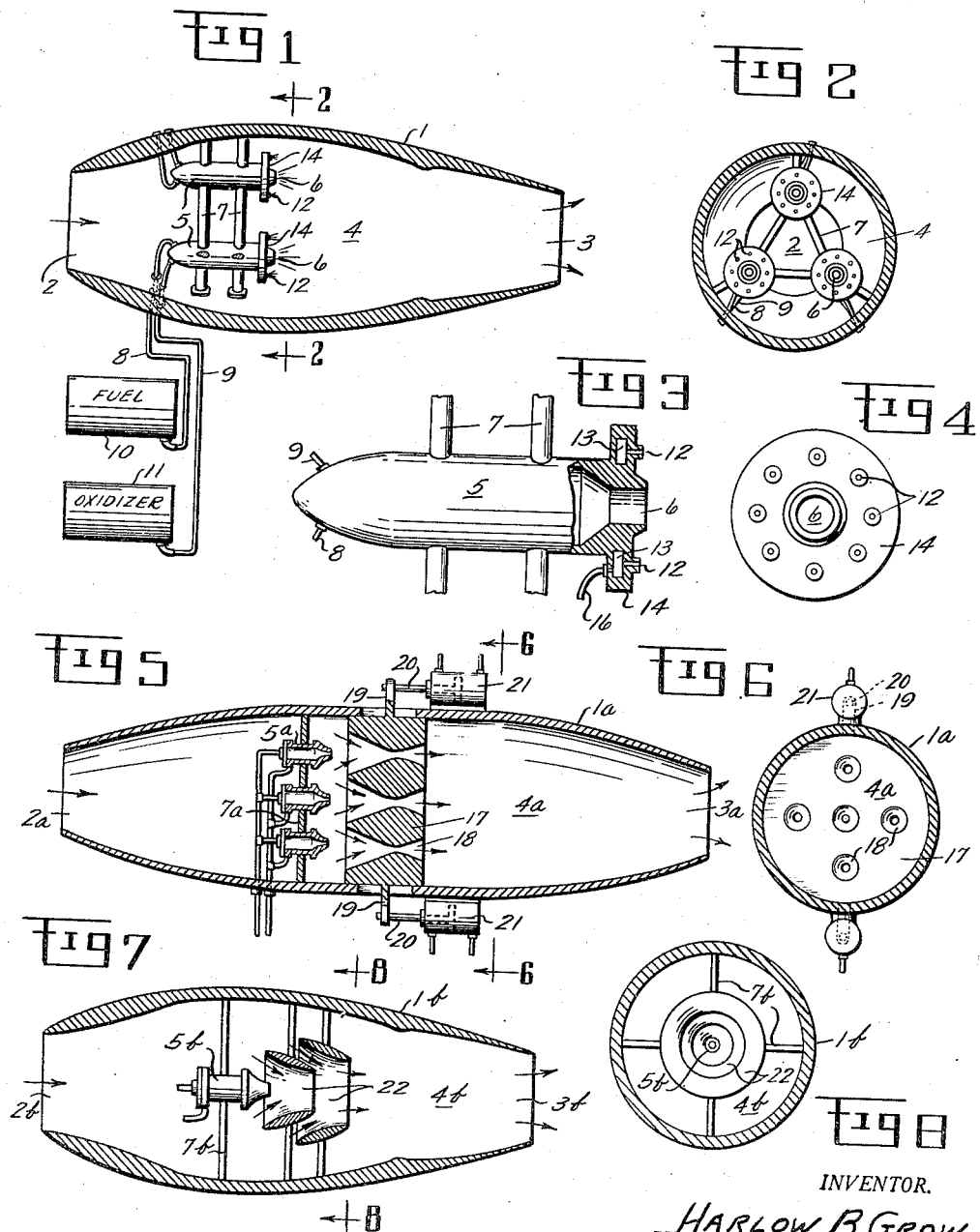

2,547,936

UNITED STATES PATENT OFFICE 2,547,936

DUCTED ROCKET PROPULSION MEANS FOR AIRCRAFT

Harlow B. Grow, New Carlisle, Ohio

Application November 17, 1944, Serial No. 563,976

2 Claims. (Cl. 60—35.6)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to jet propulsion means, and more particularly to ducted rocket propulsion means for aircraft.

In propulsion devices employing the jet propulsion principles, one type in use is commonly known as the pure jet or rocket propulsion type and employs an oxidizer, which together with the fuel, is delivered to the burning chamber, burned and discharged through the jet tube into the atmosphere to cause a reactive force in the direction opposite to the discharged end of the jet tube.

This type of jet propulsion is capable of high-thrust characteristics, especially if operated at maximum efficiency, but in propulsion devices for use with aircraft, a continued thrust must be maintained over such long-time periods, that pure jet propulsion motors cannot be operated at their maximum efficiency because proper combustion creates so much heat in the combustion chamber and burner tubes that no materials are available, even of the semi-precious types, capable of withstanding this intense heat and pressure over these prolonged periods of time.

One method of operating these pure jet motors for aircraft propulsion, in order to prevent too rapid destruction and burning out of the apparatus is to operate them inefficiently by adjusting the supply of fuel and oxidizing agent so that the combustion in the combustion chamber is incomplete. This inefficient operation reduces the degree of heat in the combustion chamber to a point where it can be handled with some degree of success, and a substantial portion of the combustion occurs as it leaves the combustion chamber and jet tubes.

Thermal-air jet propulsion differs from the aforementioned pure jet propulsion largely on the basis of the source of the oxidizer, the heat generated, and uses atmospheric air as the oxidizing agent while pure jet propulsion apparatus supplies its own oxygen. In the thermal-jet motor the air is introduced through a restricted or ram jet opening at a relatively high velocity in the front end of a ram jet casing, known as an athodyd or aerothermal dynamic body having a somewhat streamlined, enlarged, central body portion tapering to a restricted discharge opening or jet discharge passage at the other end. The velocity of the air entering the enlarged chamber is reduced and the air is dynamically compressed, after which intense heat is applied to the air, causing its expansion and discharge through the restricted discharge passage at a high velocity. This produces a forward thrust on the body in the direction away from the discharge jet opening or duct.

Pure jet apparatus, carrying its own oxidizer is light in weight, has no moving parts, and can function independently of the atmosphere, but its operating efficiency, as mentioned before, must be necessarily low and not tolerable in practice as a main propulsion device for aircraft.

An object of the present invention is the provision of an improved aircraft propulsion device, employing a combined thermal and pure jet or rocket propulsion apparatus.

A further object is the provision of a combined thermal-air and pure jet propulsion motor in which the pure jet principle is employed within a thermal air jet propulsion device to increase the efficiency of the apparatus.

A still further object of the invention is the provision of apparatus which eliminates the usual moving parts employed in the conventional thermal-air jet propulsion motor and increases the efficiency of the device by employing pure jet propulsion means within the thermal-air jet motor for supplying the thermal efficiency to the air introduced into the apparatus and effecting compression of the air prior to its heating and discharge.

A still further object is the provision of a combined thermal-air jet and pure jet propulsion means in which the efficiency lost in the pure jet motor is utilized to effect a more efficient operation of the thermal-air jet portion of the propulsion means.

Other objects and advantages of the invention will become apparent from the following description, taken in connection with the accompanying drawing, in which like-reference characters refer to like parts in the several figures.

Drawing

Fig. 1 is an enlarged longitudinal sectional view taken through my improved aircraft propulsion motor.

Fig. 2 is a cross-sectional view taken approximately on the plane indicated by line 2—2 in Fig. 1.

Fig. 3 is an enlarged detailed view of one of the pure jet or rocket motors employed by me and located within the thermo-air jet propulsion motor.

Fig. 4 is an end view of the jet unit shown in Fig. 3.

Fig. 5 is an enlarged sectional view of the modified form of my invention.

Fig. 6 is a cross-sectional view taken on 6—6 of Fig. 5.

Fig. 7 is a further modification; and

Fig. 8 is a sectional view taken on line 8—8 of Fig. 7.

Referring more particularly to Figure 1 of the drawing, the reference numeral 1 indicates generally a casing or ram jet body of the thermal-air jet propulsion design, having an air admission port or ram jet opening 2 at the front end thereof and a jet discharge or duct 3 at the opposite or rear end portion. The portion of the body 1 intermediate the ram jet inlet and discharge ports 2 and 3 is streamlined to form an enlarged intermediate air compression and heating chamber 4.

Located within the body between the air inlet port 2 and the enlarged air compression chamber 4 are a plurality of pure jet propulsion devices or rocket motors 5, each having their discharge opening 6 facing the jet discharge opening 3 of the body.

The pure jet propulsion motors 5 are integrally supported from the side wall of the chamber 4 by suitable supports or brace members 7 so as to communicate the forward thrust of these pure jet motors 5 to the body when they are in operation within the body.

Fuel and a suitable oxidizer are supplied to the pure jet motor 5 in the usual manner, conduits 8 and 9 forming suitable fuel and oxidizer medium supply means from the supply tanks 10 and 11, suitably carried on the aircraft or vehicle structure to be propelled (not shown) which carries the ram jet body.

In this form of invention, when the pure jet motors are in operation and the vehicle or aircraft carrying the ram jet body 1 is moving forward at the desired velocity, air enters the restricted ram jet inlet 2, passes into the enlarged portion of the streamlined compression chamber 4. As the air moves toward the larger portion of the interior of the chamber, it loses some of its velocity and its mass pressure is increased. The incoming air through the inlet opening or mouth 2 causes the air to be compressed dynamically or rammed in the space just to the rear of the pure jet motors 5. The jets from these pure jet motors produce an intense blast of heat which is projected rearwardly through the compression chamber toward the discharge end 3, this induces a flow of air around the jets, and the heat from the pure jets is transferred to the air in the compression chamber 4, tending to increase the pressure of the air against the walls of the chamber with a resulting increase in velocity through the discharge end.

Since these pure jet motors 5 are usually and necessarily operated with a considerable amount of the combustion taking place within the athodyd body in the rear of the jets this intense heat and blast effectively heats and expands the incoming air in the combustion chamber and the reactive or forward thrust of the pure jet motor 5, and the forward thrust of the thermal-air jet arrangement of the ram jet body are accumulative to provide a high total forward thrust on the vehicle or aircraft on which my improved propulsion motor is mounted.

The apparatus is light in weight since the usual power operative compressor ordinarily employed and its motors are eliminated. The pure jet motors may be operated successfully within the ram jet body since any combustion taking place at or outside of the pure jet discharge ducts is not wasted as when pure jet motors alone are employed, but is utilized to heat the air within the body to obtain the desired expansion thereof in the chamber 4. The exchange of heat between the pure jet propulsion devices and the air passing the bodies of these devices tends to increase the thermal efficiency of the air, and helps to maintain the pure jet propulsion members cooled to below their destructive temperatures.

In the event that the heat transfer from the pure jet motor body and from the pure jet discharge is not sufficient to heat the air that is compressed in the heating and compression chamber 4, each pure jet motor 5 may be provided with supplemental heating means, indicated generally at 14 in the drawings.

Referring more particularly to Figs. 3 and 4, disclosing enlarged views of the jet motor 5, this auxiliary air-heating means may be in the form of an annular chamber 13, in a peripheral flange projecting laterally from the discharge end of the pure jet motors. This flange is provided with a plurality of burner apertures 12. Fuel for these burners 12 is supplied to the annular chamber 13 in any suitable or well-known manner, such as by the fuel-delivered conduits 16. The heat supplied to the air in the thermal air or ram jet compression chamber 4 by these supplemental burners 12, and the heat exchange between the pure jet propulsion devices 5 and the air is sufficient to maintain my improved combined pure and thermal-air means operating at a maximum thrust efficiency.

Referring to the modified form of the invention, as disclosed in Fig. 5, the body of the ram jet casing is similar in shape to the form shown in the Figs. 1 and 2 and is provided with an air-intake port 2a at the front end and a discharge duct 3a at its rear or opposite end. The enlarged intermediate portion of the ram jet casing, indicated at 4a is cylindrical for a portion of its length, and has slidably mounted within the cylindrical portion a partition 17.

The partition 17 has formed therein a plurality of the aspirator or funnel-shaped openings 18 adapted to axially register with pure jet propulsion motors 5a carried by the ram jet casing or body, on fixed supports 7a. These motors 5a are supplied with fuel and a suitable oxidizing agent in the same manner as the pure jet motors disclosed in Fig. 1. Provision is made for adjusting the longitudinal position of the partition 17 carrying the funnel-shaped openings or aspirator ports 18 with respect to the pure jet motors. The body is preferably slotted longitudinally at opposite sides to receive arms 19 projecting from the partition member 17. These arms 19 may be connected to any suitable adjusting means such as rods 20, carried on pistons, located within the hydraulic cylinders 21 which are secured on the exterior on the body 1. Pressure may be applied to either end of the cylinders 21 to shift the partition member 17 to vary the position of the aspirator openings with respect to the jets from the pure jet motors 5a.

In the operation of this form of invention, air passes into the body through the restricted inlet port 2a, around the pure jet motors 5a. The blast from the pure jet motors passing through the aspirator openings in the partition member 18, causes the air in the forward portion of the body to be forced into the rear portion or compression end of the heating chamber 4a and the heat transfer to the air in the compression chamber from the pure jet discharge and from the partition wall causes the expansion and discharge of the air from the body and the forward thrust to the body.

Referring to the modified form of my invention, disclosed in Figs. 7 and 8, the body 1b is provided, in the forward portion of the enlarged compression and heating chamber 4b, with a plurality of concentric rearwardly-tapering aspirator tubes or funnels 22, rigidly supported from the interior wall of the body. A pure jet propulsion motor or device 5b is securely mounted by fixed supports 7b in the body in advance of the aspirator funnels 22, so that the jet therefrom passes centrally through the funnels into the compression and heating chamber 4b.

Air entering the air inlet opening 2b in the forward end of the body is packed or rammed into the expansion and compression chamber 4b due to the aspirator action of the pure jet passing through the funnels 22, and is heated. The pure jet blast provides the necessary thermal energy for the thermal-air jet and the thrust of the pure jet propulsion device 5a together with the thrust of the thermal-air jet portion of the body effects a maximum thrust with a minimum loss in energy and efficiency.

Having described my invention in connection with several embodiments, it is understood that various changes may be made in the shape, size, and arrangement of the parts without departing from the spirit of the invention as defined by the appended claims.

I claim:

1. In a combined thermal air jet and pure jet propulsion motor of the class described, a ram jet body having an air inlet port at its front end, a thermal air discharge port at its rear end, with an enlarged air compression and heating chamber intermediate said ports, a pure jet propulsion motor rigidly carried within the body in the enlarged portion thereof, having a pure jet discharge opening facing rearwardly and located slightly in advance of the longitudinal center of the chamber, for directing a pure jet discharge rearwardly through said enlarged portion of said chamber, to heat and expand the air therein, producing a combined thrust of the pure jet propulsion and thermal air jet propulsion devices, utilizing the heat from the pure jet propulsion device to compress, heat and expand the air within the thermal air jet device, and supplemental heating means adjacent the pure jet discharge opening for supplying supplemental heat to the air being compressed, heated and expanded within the chamber of the thermal air jet propulsion device by the pure jet propulsion device.

2. In a combined thermal air jet propulsion and pure jet propulsion engine, a thermal air jet propulsion device comprising a ram jet body having inlet and outlet ports in communication with an enlarged intermediate air compression and heating chamber, a pure jet propulsion motor device located within the enlarged air compression and heating chamber, having a pure jet discharge opening therein located substantially midway between the aforesaid ports and facing said outlet port, and a plurality of supplemental burners surrounding said pure jet opening for supplying supplemental heat to the air within the enlarged heating chamber of the body surrounding the pure jet discharge from the pure jet propulsion device.

HARLOW B. GROW.

REFERENCES CITED

The following references are of record in the file of this patent:

UNITED STATES PATENTS

| Number | Name | Date |
|---|---|---|
| 784,488 | Googins | Mar. 7, 1905 |
| 1,103,503 | Goddard | July 14, 1914 |
| 1,167,139 | Williams | Jan. 4, 1916 |
| 1,369,672 | Koenig | Feb. 22, 1921 |
| 1,375,601 | Morize | Apr. 19, 1921 |
| 1,389,797 | Thompson | Sept. 6, 1921 |
| 2,396,911 | Anxionnaz | Mar. 19, 1946 |

FOREIGN PATENTS

| Number | Country | Date |
|---|---|---|
| 484,405 | Great Britain | May 2, 1938 |
| 798,489 | France | Mar. 10, 1936 |
| 818,703 | France | June 21, 1937 |
| 330,905 | Italy | Oct. 26, 1935 |
| 612,362 | Germany | Apr. 18, 1935 |